(12) United States Patent
Shearer

(10) Patent No.: US 11,758,849 B2
(45) Date of Patent: Sep. 19, 2023

(54) CROP HARVESTING HEADER WITH CAM ADJUSTMENT COMPONENT RESPONSIVE TO REEL MOVEMENT

(71) Applicant: MacDon Industries Ltd., Winnipeg (CA)

(72) Inventor: Bruce Robert Shearer, Winnipeg (CA)

(73) Assignee: MacDon Industries LTD, Winnipeg (CA)

( * ) Notice: Subject to any disclaimer, the term of this patent is extended or adjusted under 35 U.S.C. 154(b) by 656 days.

(21) Appl. No.: 16/638,553

(22) PCT Filed: Aug. 29, 2018

(86) PCT No.: PCT/CA2018/051040
§ 371 (c)(1),
(2) Date: Feb. 12, 2020

(87) PCT Pub. No.: WO2019/046930
PCT Pub. Date: Mar. 14, 2019

(65) Prior Publication Data
US 2020/0214208 A1    Jul. 9, 2020

Related U.S. Application Data

(60) Provisional application No. 62/554,092, filed on Sep. 5, 2017.

(51) Int. Cl.
*A01D 57/04*    (2006.01)
(52) U.S. Cl.
CPC .................................. *A01D 57/04* (2013.01)

(58) Field of Classification Search
CPC ......... A01D 57/04; A01D 57/02; A01D 57/03
See application file for complete search history.

(56) References Cited

U.S. PATENT DOCUMENTS 2,795,920 A * 6/1957 Steuerwald ............ A01D 57/04
403/107
4,835,953 A * 6/1989 Naaktgeboren ........ A01D 57/03
56/226

(Continued)

FOREIGN PATENT DOCUMENTS

| CN | 203633171 U | * | 6/2014 | |
|---|---|---|---|---|
| CN | 206452770 U | * | 9/2017 | |
| EP | 0280792 A1 | * | 9/1988 | ............. A01D 57/04 |

*Primary Examiner* — Thomas B Will
*Assistant Examiner* — Joan D Misa
(74) *Attorney, Agent, or Firm* — Miller Canfield

(57) ABSTRACT

A crop harvesting header includes a reel for controlling movement of the crop in the area over the cutter bar to the transport draper carried on two reel mounting arms for upward and downward movement and for moving the reel forwardly and rearwardly along the respective reel mounting arm. The reel has a plurality of reel bats with reel fingers projecting generally radially outwardly from the reel axis where the reel bats are pivotal to vary the angle of the finger driven by a cam track member. An adjustment component defined by a follower in a guide track along one of the arms is responsive to movement of the reel along the arm which causes the cam track member to be angularly advanced and retarded about the reel axis to different adjustment angles in dependence upon the position of the reel along the mounting arms.

15 Claims, 7 Drawing Sheets

(56) References Cited

U.S. PATENT DOCUMENTS

| | | | | |
|---|---|---|---|---|
| 5,768,870 A | * | 6/1998 | Talbot | A01D 57/03 56/220 |
| 6,138,447 A | * | 10/2000 | Stivers | A01D 57/02 56/14.4 |
| 6,591,598 B2 | * | 7/2003 | Remillard | A01D 57/03 56/226 |
| 6,651,411 B1 | * | 11/2003 | Becker | A01D 57/04 56/10.2 A |

* cited by examiner

SECTION A-A

CROP HARVESTING HEADER WITH CAM ADJUSTMENT COMPONENT RESPONSIVE TO REEL MOVEMENT

This invention relates to a crop harvesting header including a cutter bar and a reel for controlling movement of the crop in the area over the cutter bar. The reel is rotatable about an axis generally parallel to the cutter bar and has a plurality of reel bats each having reel fingers projecting generally radially outwardly from the reel axis. The reel bats are pivotal each about a respective bat axis parallel to the reel axis so as to vary the angle of the fingers about the bat axis as the reel rotates. The reel co-operates with a cam track member carried on the header in generally stationary position relative to the rotation of the reel so that each bat has a crank arm with a cam track follower on the crank arm which follows the cam track as the reel rotates and causes the required pivotal movement of the bat.

One example of a header of this type including reel as defined is shown in U.S. Pat. No. 6,591,598 (Remillard) assigned to the present applicants and issued Jul. 15, 2003.

SUMMARY OF THE INVENTION it is an object of the present invention to provide a header of this general type where the movement of the bat fingers is improved.

According to the invention there is provided a crop harvesting header comprising:

a header frame structure arranged for movement in a direction of working movement across ground carrying a crop to be harvested; a cutter bar arranged across a forward edge of the header frame structure for cutting the crop;

a cut crop transport arrangement mounted on the header frame structure for receiving and transporting the cut crop for further processing;

a reel for controlling movement of the crop in the area over the cutter bar;

the header frame structure comprising at least two reel mounting arms for movement therewith in the direction of movement;

the mounting arms being mounted on the header frame structure for upward and downward movement relative to the cutter bar;

each mounting arm having a reel mounting assembly supporting the reel on the mounting arm for rotation about a reel axis generally parallel to the cutter bar;

each reel mounting assembly including a component for moving the reel forwardly and rearwardly along the respective reel mounting arm;

the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;

each of the reel bats being pivotal about its respective bat axis parallel to the reel axis so as to vary the angle of the fingers about the bat axis as the reel rotates;

at least one of the reel mounting assemblies including a control component arranged such that, as the reel rotates, control component cooperates with the respective bat to cause pivotal movement of the respective bat about the bat axis;

and an adjustment component responsive to movement of the reel along the mounting arms which causes the control component to be rotated about the reel axis to different adjustment angles in dependence upon the position of the reel along the mounting arms.

Preferably the control component comprises a cam track member surrounding the reel axis and lying in a radial plane of the reel axis wherein each bat has associated therewith a cam follower which follows the cam track member.

Preferably the cam track member is held during rotation of the reel against rotation with the reel relative to the reel axis.

Preferably the adjustment component comprises a linkage interconnecting the respective mounting arm and the mounting assembly on that arm which automatically causes the movement of the cam track.

Preferably the linkage includes a link member connected directly or indirectly to the cam track member and a component which moves the link member to different distances from said respective one of the mounting arms.

In a particularly preferred arrangement the linkage comprises a guide track extending along the arm and a guide track follower attached to said at least one mounting assembly where the guide track provides a shape which moves the guide track follower to different positions relative to the arm at different locations along the arm.

That is, as the reel is slid ahead on the reel arms by the fore-aft cylinders, a finger pitch pin on the cam track member runs in the guide track that automatically adjust the finger angle based on the reel fore aft position.

Typically if the crop is very flat on the ground it is desirable to push the reel ahead and increase the finger angle. For fields that contain both standing and lodged crop it is too much work for the operator get out and change the angle of the fingers for areas on the field. The arrangement herein thus provides an automatic adjustment which is responsive to the position of the reel along the mounting arms.

When the reel is moved ahead the reel rotates the angle. In particular, the "release point" of the fingers stays in the same correct position, which is located just behind the cutter bar, even though the reel itself is moved forwardly. This requires the an advancement of the angular position of the angular adjustment component in the forward or counter-clockwise direction effectively to match the forward movement of the reel itself. It is believed from testing that this position of the release point is the ideal spot to set the finger angle in most cutting conditions.

In the rare condition where the reel is pulled all the way back such as in straight cut canola, the cam adjusts the finger angle differently for that task using a rear part of the guide track.

In addition to the adjustment caused by the guide track, the cam track member can also be adjustable by a further adjustment component, which causes the cam track member to be rotated about the reel axis to different adjustment angles, which is independent of said adjustment component and preferably actuated manually rather than as a response to movement of the reel such as by an operator in response to changes of crop.

In the preferred arrangement, the guide track is arranged to move the guide track follower to a position spaced further from the mounting arm as the mounting assembly moves forward. This is combined with the location of the guide track follower on the cam track member behind the reel axis so as to rotate the cam track member to angularly advance the cam track member in the direction of rotation of the reel as the mounting assembly moves forward along the mounting arm.

Preferably the guide track is arranged to rotate the cam track member to angularly advance the cam track member the direction of rotation of the reel as the mounting assembly moves forward along the mounting arm.

Preferably the reel fingers move around the reel axis to define an extraction point of the finger movement at which the fingers effectively move along their length to extract from the crop and the cam track member is rotated so as to angularly advance the extraction point as the mounting assembly moves forward. This can be used to keep the extraction point just behind the cutter bar as is preferred in the cutting operation.

Preferably the adjustment component is arranged such that, at a middle position along the arms the cam track member is most retracted and at forward and rearward ends of the arms the cam track member is most advanced. This can be used for a first crop in a range from the middle position to the forward end and used for a second crop in the range from the middle position to the rearward end. In order to provide this, preferably the guide track has an arcuate shape which provides the middle and advanced positions.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
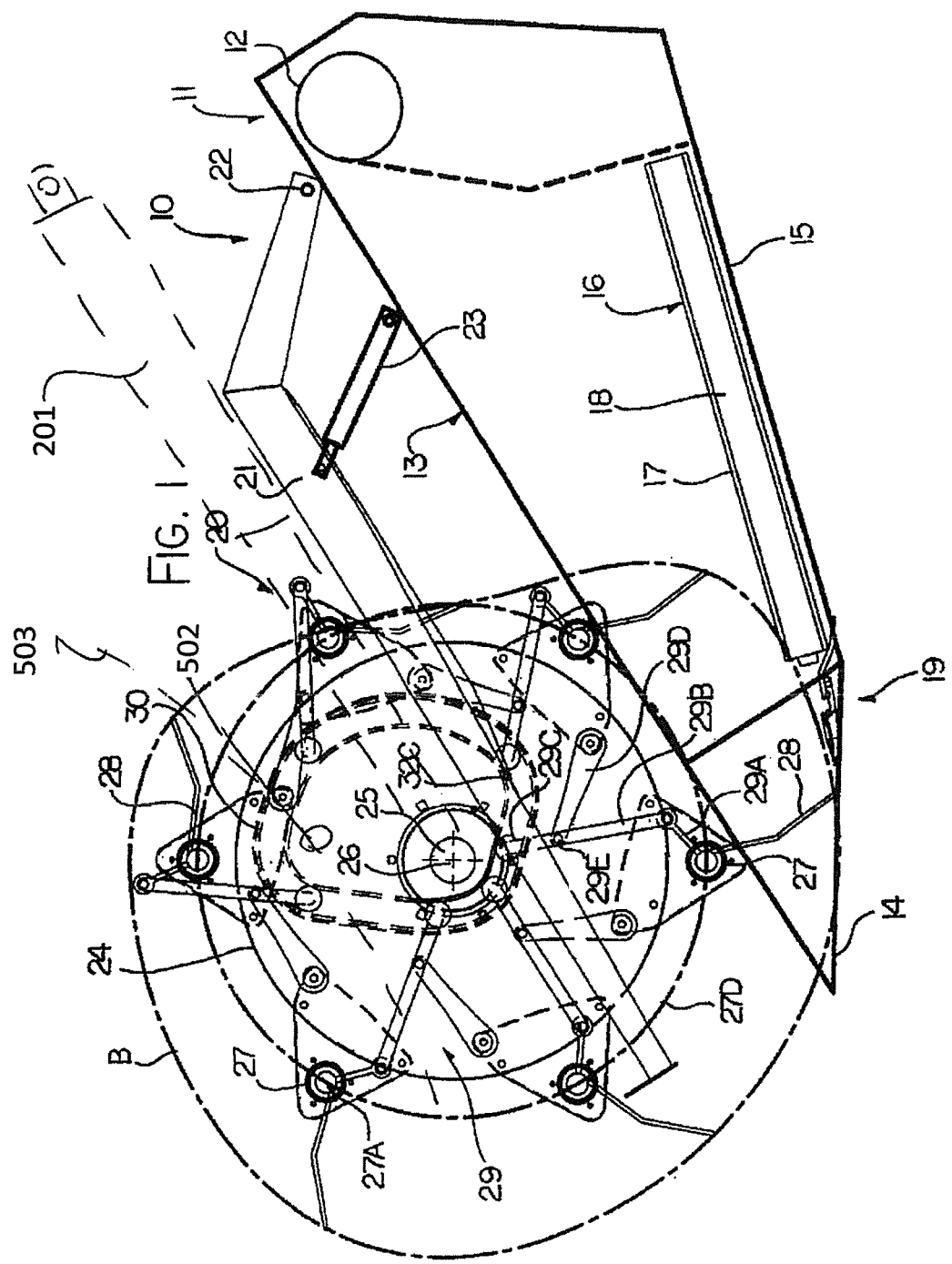
FIG. 1 is a schematic view of a header according to the present invention looking along the header toward one end and showing the reel, reel support arms, tine tubes, table, header frame, frame end sheet, cam and control linkages, with the end mounting disks of the reel omitted for convenience of illustration.

In FIG. 1 is shown an embodiment of a header according to the present invention with a number of the elements being shown schematically. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14. The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The number of arms can vary in accordance with engineering requirements depending upon the width of the header. Some headers have only arms at the ends and some have additional arms intermediate the ends to provide the necessary support. The reel can also be provided in separate sections arranged end to end which are independently supported on separate arms.

The reel further includes end support discs, one of which is shown only schematically in FIG. 1 as a circle at the end of the reel but it will be appreciated that the structural arrangement of the disc can vary in accordance with engineering requirements. The end disc is indicated at 24 and is mounted on a shaft 25 which supports the disc for rotation about an axis 26 of the reel.

The disc supports a plurality of reel bats 27 at angularly spaced positions around the axis 26. Each reel bar carries a plurality of longitudinally spaced fingers 28 which project outwardly from the bar for engaging the crop Each reel bat is pivotal about its own individual axis parallel to the axis 26 so as to change the angular position of the fingers around the axis 27A of the bat. The angular position of the bat about its axis is controlled by a linkage 29 of the bat which co-operates with a cam 30 of the reel so that as the bats rotate the linkage moves the bats to the required angular position in dependence upon the co-operation of the linkage with the cam.

Figure 2:
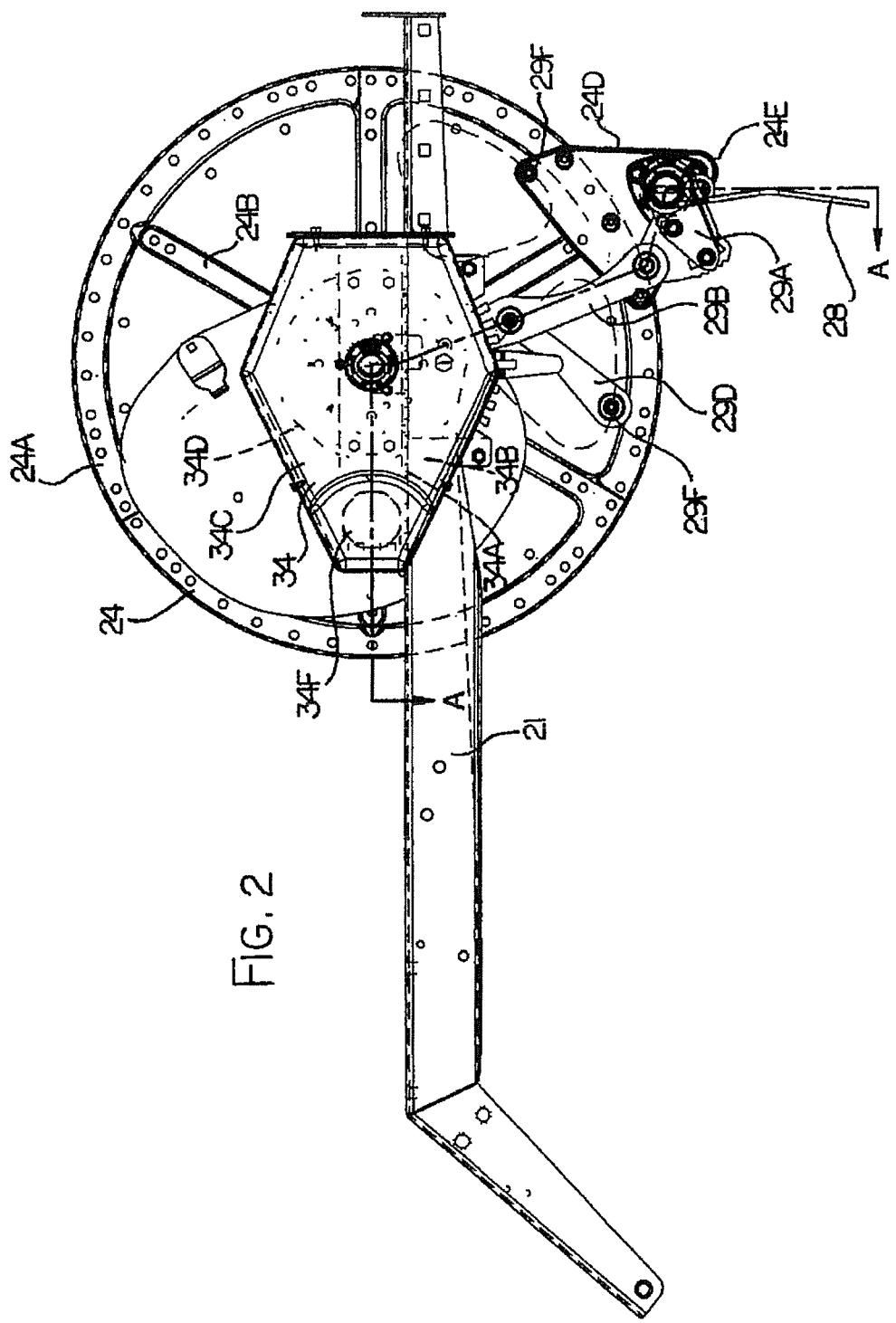
FIG. 2 is an end elevation of the reel of FIG. 1 looking from the opposite direction and showing only the components of the reel and reel support arms, with only one of the tine tubes and associated components shown for convenience of illustration.

The disc 24 as better shown in FIG. 2 comprises a peripheral ring 24A and a plurality of spokes 24B attached to a tube 24C which extends along the length of the reel and provides structural support therefore. The shaft 25 is suitably attached within the tube as a stub shaft portion projecting from one end of the tube for mounting of the reel structure on bearings outboard of the reel and mounted on the arm 21 as discussed hereinafter.

The ring 24A carries a plurality of bat support brackets 24D at spaced positions around the axis of the reel with each bracket carrying a respective one of the bats 27 and its longitudinally spaced fingers 28. Each bracket is generally triangular in shape and fastened to the ring 24A at locations which provide suitable mounting therefore and may provide adjustment for the position of the bracket and the ring. The bracket extends generally outwardly to an apex 24E outboard of the ring 24A at which is attached a bearing assembly 24F for the bat 27. The bearing 24F defines a bearing axis 27A parallel to the axis 26. In the embodiment shown the bats are cylindrical tubes, otherwise known as a tine tube, on which is attached a plurality of the fingers 28 using conventional mounting methods. In the embodiment shown the fingers are of spring metal with a base mounting portion 28A attached on the outside of the tube and two conjoined fingers each having a coil spring 28B attached to the mounting portion 28A and extending outwardly from the bat in the required direction. Other arrangements of fingers and bats can be used and are well known to one skilled in the art which are not necessarily cylindrical and are not necessarily formed from spring metal but can be of other shapes and include plastic fingers and the like.

Figure 3:
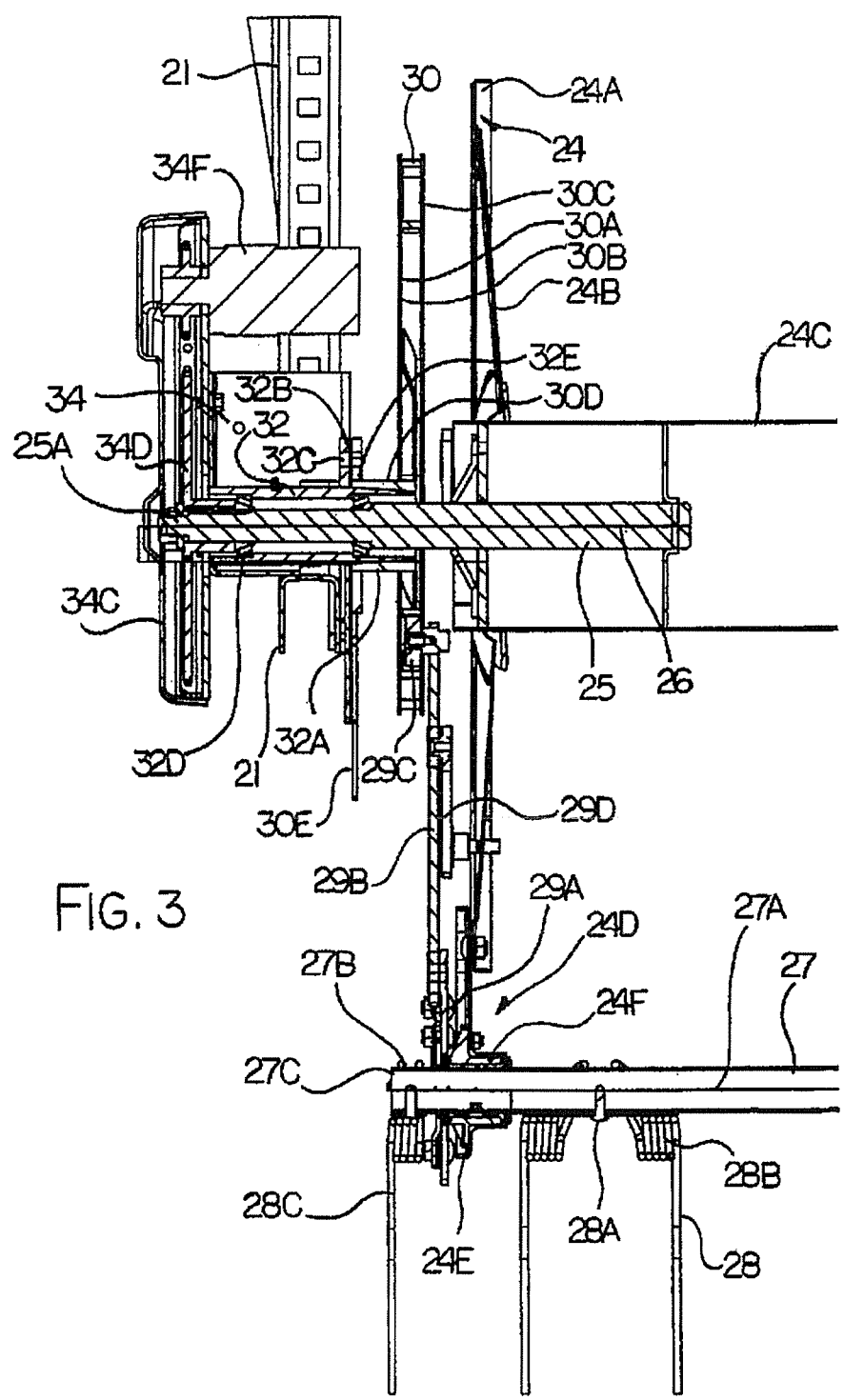
FIG. 3 is a cross sectional view along the lines A-A of FIG. 2.

Along the length of the bar is provided a series of the conjoined double fingers for which one of which is shown in FIG. 3. At the end of the bat is a stub portion 27B which projects through the bracket 24D and bearing 24F so as to project axially beyond the disc 24 and axially beyond the flat bracket 24D attached to the disc to an end face 27C of the bat which is thus located beyond the disc toward the end of the header. An additional single finger 28C is located on the stub portion 27B directly at the end 27C so that the finger 28C is located as far as possible along the bat towards its extreme end and particularly the end face 27C. In view of the relatively short length of the stub portion 27B, the finger 28C is formed as a single finger element rather than a double finger element conventionally used. However a longer stub portion could be provided making use of a conventional double finger construction.

The bats 27 lie on a circle 27D (FIG. 1) surrounding the axis 26 of the reel which defines a cylinder containing the axes 27A of the bats and is called hereinafter for convenience the "the bat circle". It will of course be appreciated that the "bat circle" is intended to relate not merely to a theoretical circle but to the volume swept by the bats as they rotate which of course must be open to allow the bats to rotate without interference without other components and particularly the cam 30.

The cam 30 comprises a base plate 30A which is flat and arranged to lie in a radial plane of the axis 26. On a face 30B of the plate is provided a cam track member 30C which faces the reel and is defined by inner and outer cam track walls which provide a guide for a cam follower. The cam track member can provide guide surfaces which lie in the radial plane and face radially outwardly or radially inwardly so that the follower runs on an outer edge of the track or on an inner edge of the track. The construction of the cam track is of a conventional nature and defines a continuous track surrounding the axis 26 and shaped to provide a required finger pattern as discussed hereinafter. A sleeve member 30D is rigidly attached to the outside surface of the plate 30A and projects therefrom axially along the axis 26. At the end of the sleeve member 30D is rigidly attached a mounting and adjustment plate 30E defining a ring portion 30F surrounding the axis and a lever portion 30G projecting outwardly from the axis and including a locating hole 30H. The ring portion includes mounting slots 30J.

The sleeve 30D engages around a mounting tube 32 at an end portion 32A of the tube. The tube 32 carries a flange 32B which butts against the mounting plate 30E when the sleeve 30D is inserted onto the end 32A of the tube 32. Holes 32C in the plate 32B align with the slots 30J and allow these plates to be clamped together thus tightly pulling the sleeve 30D onto the tube 32 in a clamping action. For this purpose the end portion 32A and the sleeve 30D are tapered so as to ensure accurate alignment of the axes of the tube and the sleeve and therefore an accurate alignment of the radial plane of the plate 30A of the cam with the axis of the tube 32.

The shaft 25 of the reel is mounted within the tube 32 on axially spaced bearings 32D and 32E so that the shaft projects through the tube 32 to an outer end 25A. Thus the shaft 25 is maintained by the axially spaced bearings 32D and 32E accurately axially in alignment with the tube 32 and therefore accurately with the plane of the cam 30 lying in the radial plane of the axis of the shaft 25. The tube 32 is attached to a housing or mounting assembly 34 which is mounted on the arm 21. The housing 34 includes a top plate 34A and a depending flange 34B attached to the tube 32 and sitting over the top of the channel defining the arm 21. The mounting assembly 34 further includes a housing 34C containing a drive sprocket 34D to which a drive motor 34F is attached with the sprocket keyed to the end 25A of the shaft 25. The bracket 34A angularly orients the housing relative to the axis of the reel. The mounting assembly 34 can move longitudinally of the arm to adjust the forward to rear position of the reel on the arm using adjustment openings 21C in the arm as is known to one skilled in the art. The mounting assembly 34 is thus rigidly attached to the tube 32 but sits on the arm allowing some twisting movement between the mounting assembly and the arm so that the axis of the tube which is accurately aligned to the axis of the reel can twist relative to the arm to accommodate twisting movements in the frame during operation or twisting movements in the reel due to differential lifting forces or other forces on the reel during operation. However the accurate alignment of the reel axis with the axis of the tube 32 ensures that, whenever any such twisting movements occur, the twisting movements do not occur relative to the cam which is maintained in a radial plane.

Figure 5:
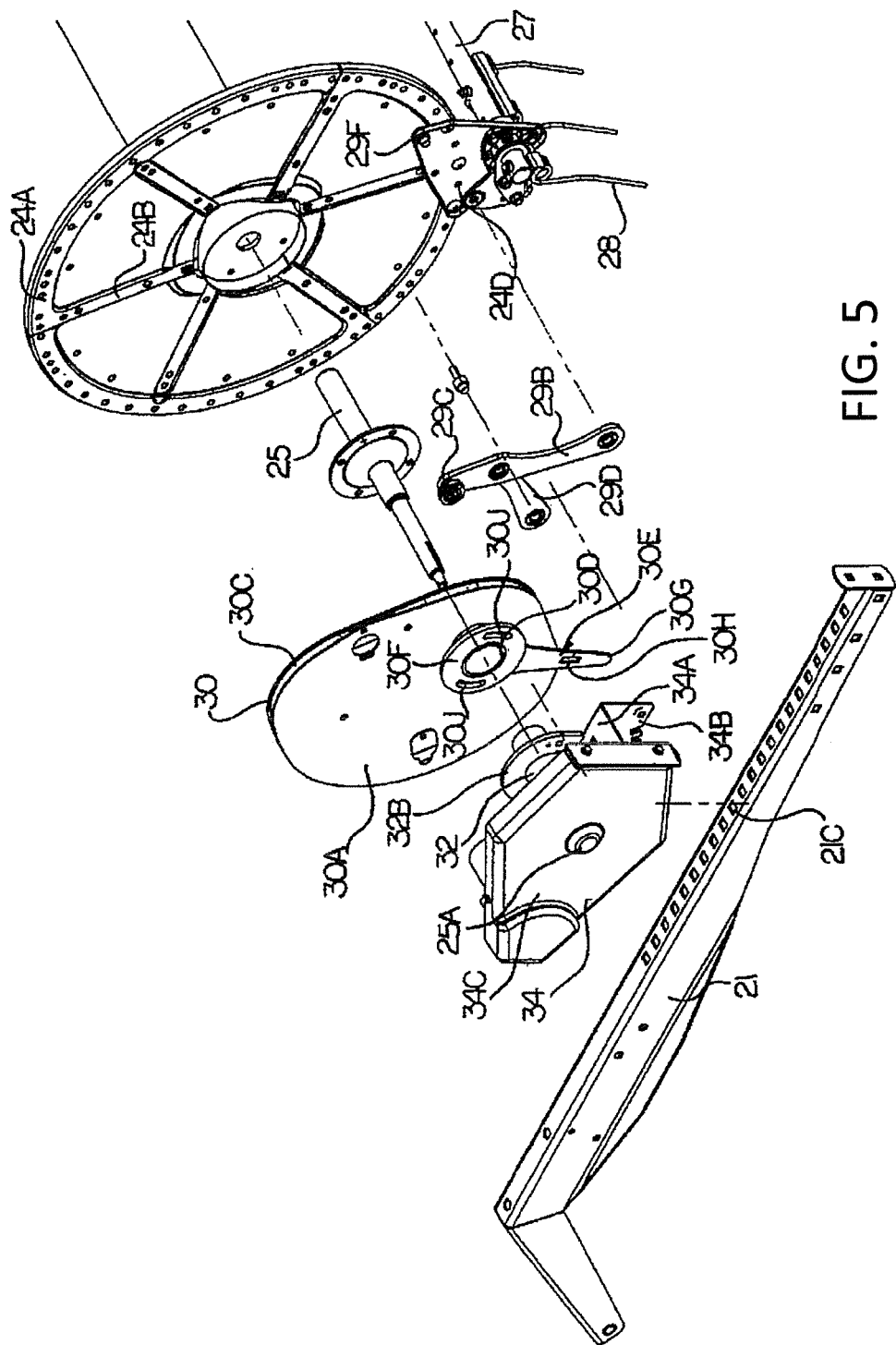
FIG. 5 is an exploded view of the components of FIG. 1.

Adjustment can be effected for the finger pattern and location by rotating the cam 30 about the axis of the reel. As shown in FIG. 5, this is achieved by loosening the coupling between the plate 30E and the plate 32B and by rotating the lever portion 30G around the axis of the tube 32 within the bounds of the slots 30J. This allows the plates to be clamped back together in the fixed position after the adjustment is effected. During this adjustment the cam remains accurately in the required radial plane.

Figure 4:
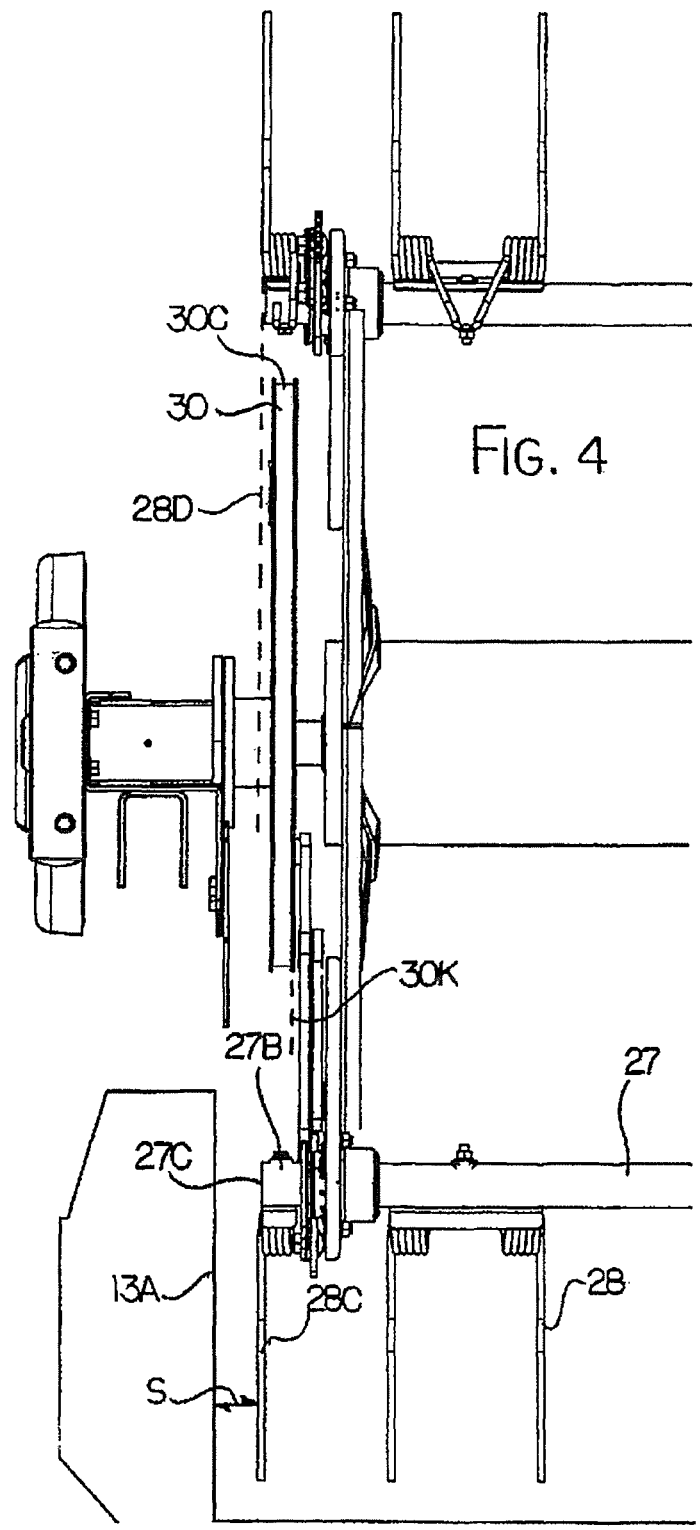
FIG. 4 is a front elevational view of the reel similar to that of FIG. 3 showing the inter-relation between the reel and the frame end sheet.

The cam 30 is shaped and arranged and dimensioned so that it lies wholly within the bat circle. Thus the outside periphery of the cam at the cam track 30C lies wholly within the path of movement of the bats and wholly within the structure defined by the bats 27 and the elements supported thereby so that the bats are located outside of the cam. Thus as shown in FIG. 4 the stub portion 27B carrying the finger 28C is aligned with the cam or slightly beyond the cam. Thus as shown a line 28D containing the end fingers 28C is slightly beyond the cam toward the end of the header of the header. This allows the fingers 28C to be located as close as possible to an end sheet 13A of the end frame section 13 to provide a sweeping action on the crop immediately adjacent that sheet. Thus the use of a small cam inside the bat circle allows these fingers, to approach much more closely the end of the header and to avoid a space S between the end fingers 28C and the sheet 13A which is sufficient to allow crop to accumulate. This is achieved by the fact that the end face 27C is at least aligned with a line 30K at the inwardly facing end of the cam and more preferably is beyond that line.

In order to achieve this location and size of the cam, the cam co-operates with the control linkage 29 which co-operates between the bat and the cam track. The control linkage is shown schematically in FIG. 1 and comprises a crank 29A attached to the bat and rotatable at one end about the axis of the bat so as to rotate the bat about its axis as the angle of the crank is changed. The linkage further includes a control link 29B which is attached to the other end of the crank and extends therefrom to a cam follower 29C within the cam track 32C. The linkage further includes a guide link 29D which is connected between a suitable location on the reel and a pivot pin 29E on the control link so that the position on the control link is controlled.

For convenience the guide link 29D connects between the control link 29B and a pivot pin 29F on the next bracket 24D. However other connection points can be used provided that the pivot pin 29F is fixed relative to the reel and rotates with the reel so that the link 29D can pull the control link 29B around with the reel as the reel rotates to carry the follower 29C from FIG. 1 it will be noted that the cam follower is arranged angularly advanced relative to its respective bat axis so that the cam follower is pushed by the link 29B and guide link 29D around the cam track. This is opposite to the conventional arrangement where the cam follower is normally trailed. In order to keep the cam follower in advance of the radial line joining the axis 26 of the reel to the bat axis, the guide link 29D provides a pulling action from a position yet further angularly advanced. However pushing action from a trailing link could also be used.

The cam is shaped so that its spacing from the axis 26 changes as the cam follower rotates around the axis 26 with the reel. This change in radial distance from the axis 26 therefore of course provides a pushing action on the respective crank 29A so as to rotate each bat around its axis 27A.

Turning now to the improvement of the present invention, the arrangement described above provides a crop harvesting header 10 having a header frame structure 11 arranged for movement in a direction of working movement across ground carrying a crop to be harvested.

The cutter bar 19 is arranged across a forward edge of the header frame structure for cutting the crop.

The cut crop transport arrangement 17 is mounted on the header frame structure for receiving and transporting the cut crop for further processing.

The reel 20 for controlling movement of the crop in the area over the cutter bar is mounted on reel mounting arms 21 for movement therewith in the direction of movement where the arms are mounted on the header frame structure for upward and downward movement relative to the cutter bar operated by the cylinder 23 and for movement of the reel forwardly and rearwardly along the respective reel mounting arm operated by cylinders 201. Each mounting arm has a reel mounting assembly 34 supporting the reel on the mounting arm for rotation about the reel axis 26 generally parallel to the cutter bar 19. The arms 21 include a longitudinally extending straight portion 202 along which the mounting assembly 34 slides as pushed forwardly and rearwardly along the portion 202 actuated from the cab by an operating cylinder 201.

The reel includes the plurality of reel bats 27 as previously described at spaced positions around the reel axis 26, with each reel bat 27 having reel fingers 28 projecting generally radially outwardly from the reel axis 26. The reel bats 27 all lie on a common bat circle 27D around the reel axis 26 so that rotation of the reel causes the reel bats 27 to follow a path of movement lying on the bat circle 27D. The term "bat" as used herein is intended to include any elongate member extending along the reel which provides a support for the fingers extending outwardly therefrom. The bat can have any cross-sectional shape including circular or may have a flat surface generally along the fingers to assist in forwarding the crop.

Also as described above, each of the reel bats 27 and its fingers 28 is pivotal about its respective bat axis parallel to the reel axis so as to vary the angle of the fingers about the bat axis 271 as the reel 20 rotates. As described above, one of the reel mounting assemblies 34 includes a finger control component preferably in the form of the cam 30, which is preferably non-circular, surrounding the reel axis 26 and lying in a radial plane of the reel axis. Where the control component is a cam 30, each bat 27 has associated therewith a cam follower shown schematically at 29C in FIG. 6 which follows the cam track member 30C, such that, as the reel rotates, the movement of the cam follower 29C on the cam track member 30C causes pivotal movement of the respective bat about the bat axis and causes the fingers to take up the pattern of movement shown in FIGS. 6 and 7. As described above, the cam 30 is held during rotation of the reel stationary against rotation with the reel relative to the reel axis so that it does not rotate with the reel. However the cam or other control component can be adjusted angularly around the reel axis so as to change the finger pattern for example between the positions shown in FIGS. 6 and 7.

Figure 6:
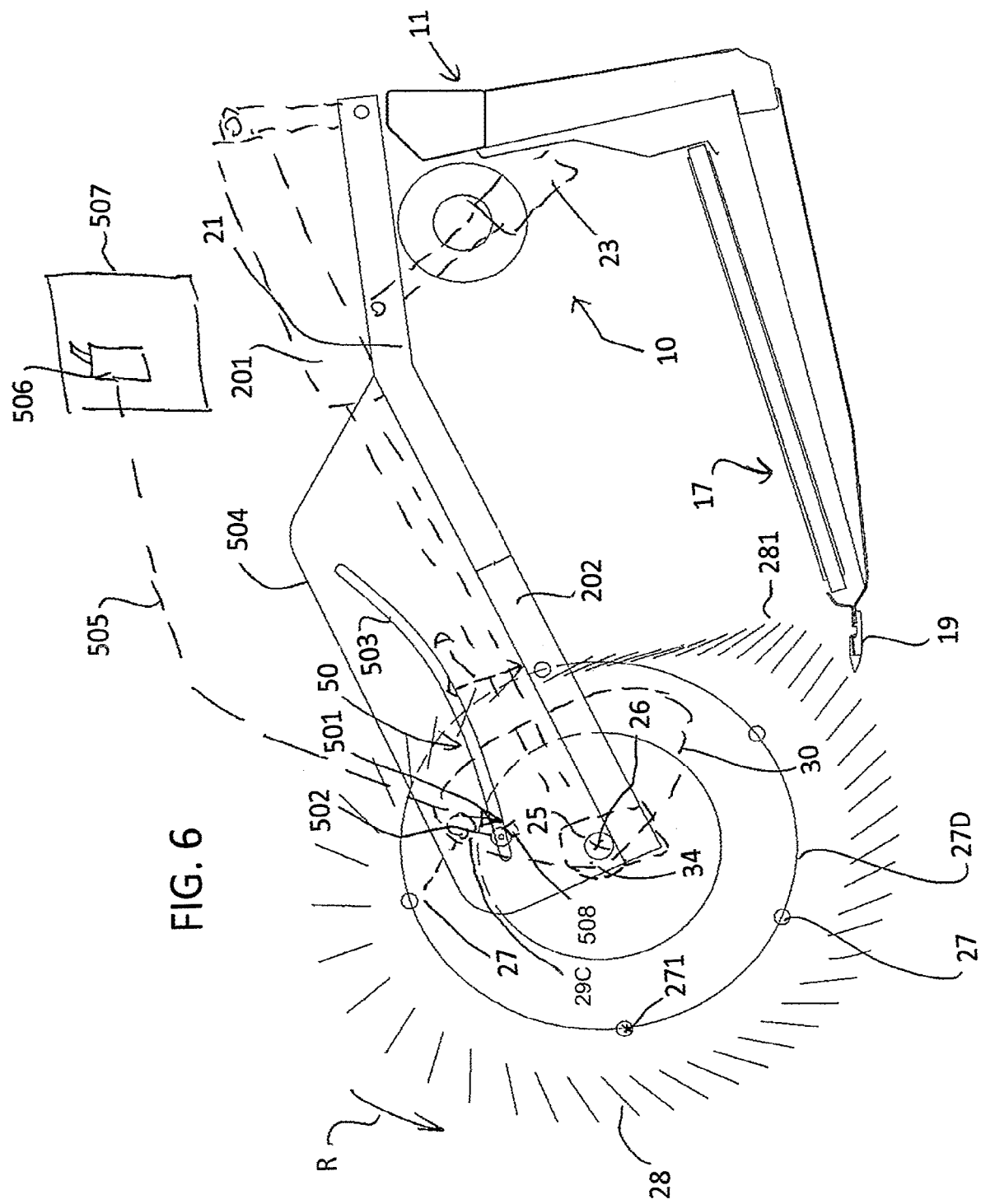
FIGS. 6 and 7 show different positions of the adjustment cam at different positions along the arms as controlled by a follower in a guide track longitudinal of the arm.

In addition to the manual adjustment provided above, there is provided in FIG. 6 an adjustment component 50 responsive to movement of the reel along the mounting arms 21 actuated by the cylinders 201 which causes the cam 30 to be rotated about the reel axis 26 to different adjustment angles of the cam 30 in dependence upon the position of the reel along the mounting arms 21.

As shown in FIG. 6, the adjustment component 50 comprises a linkage 501 interconnecting a respective one of the mounting arms 21 and the respective mounting assembly 34.

The linkage 501 includes a link member in the form of a follower wheel 502 connected directly to or mounted on the cam 30 and a guide track 503 formed in a plate 504 mounted on the arm 21 which moves the link member 502 to different distances D from the mounting arm depending upon the position of the wheel 502 along the track 503.

The guide track 503 provides a concave arcuate shape which moves the guide track follower 502 to different positions or distances D relative to the arm at different locations along the arm. As the track 503 is curved or otherwise not straight depending on the positions of the cam 30 which are required, the guide track 503 is not parallel to the arm.

As described above, the cam 30 is adjustable by a further adjustment component shown only schematically at 508 which adjusts the position of the wheel 502 relative to the cam 30, which causes the cam 30 to be rotated about the reel axis 26 to different adjustment angles, which is independent of the adjustment provided by the guide track 503, The further adjustment component 508 can be actuated manually or can be actuated by an operator sitting in a cab 507 and moving an actuator lever 506 though a control wire 505 in response to changes of crop or other conditions.

Figure 7:
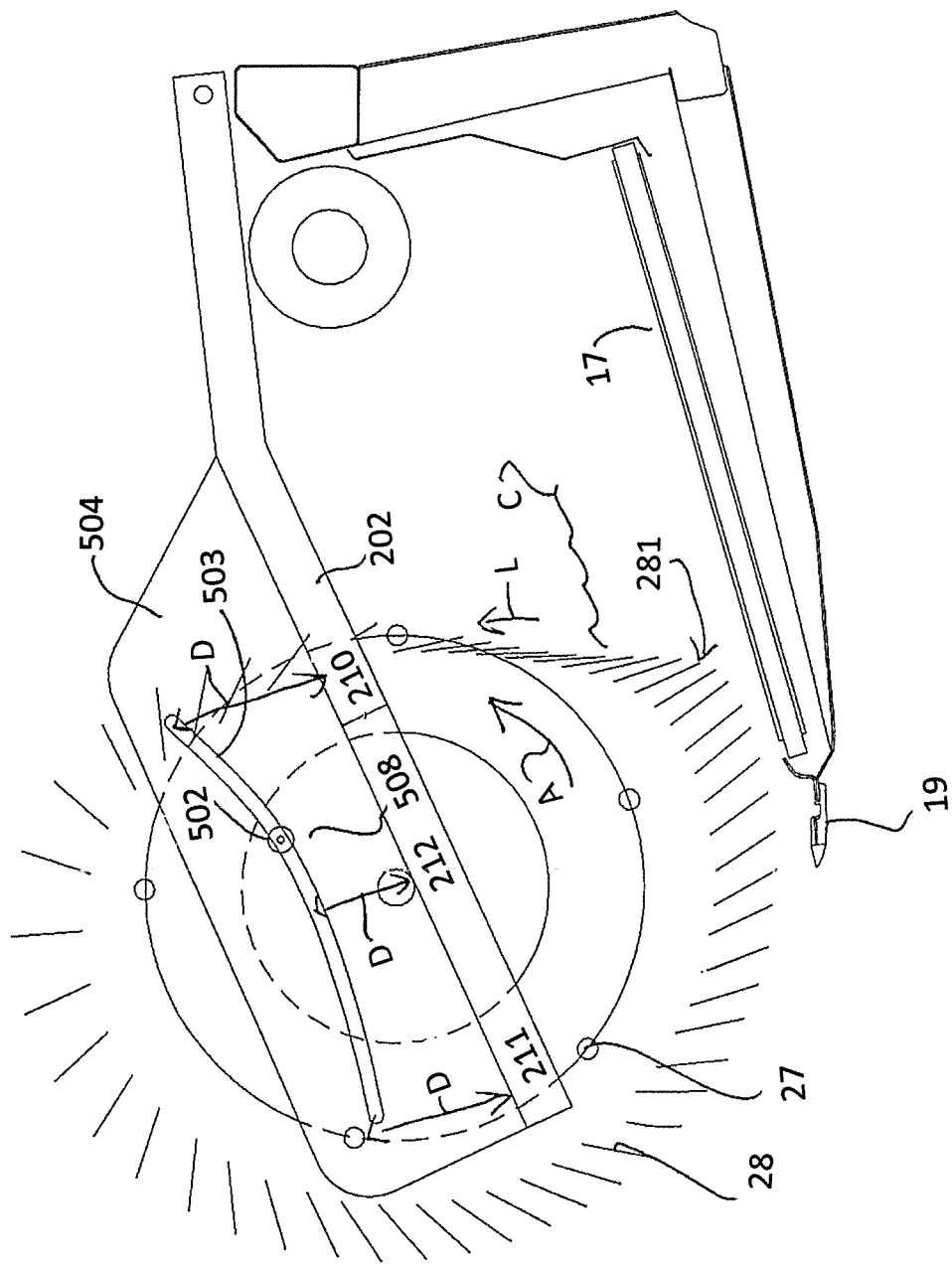

As shown by comparing the forwardmost position in FIG. 6 with a retracted position shown in FIG. 7 the guide track 503 is arranged to move the guide track follower 502 to a position spaced further from the straight portion 202 of the mounting arm 21 as the mounting assembly 34 moves forward.

As shown in FIG. 6, the guide track follower 502 is behind the reel axis 26 relative to the length of the arm and its forward position, so as to rotate the cam track member 30 to angularly advance the cam track member in the counter clockwise direction of rotation R of the reel as the mounting assembly 34 moves forward along the straight portion 202 of the mounting arm 21.

As shown by comparing FIGS. 6 and 7, the reel fingers 28 move around the reel axis to define an extraction or release point 281 of the finger movement at which the fingers effectively move along their length in the direction L to extract from the crop C and the cam track member is rotated so as to angularly advance the extraction point 281 in FIG. 7 in the direction A relative to the point in FIG. 6 as the mounting assembly moves forward.

The release point is the location where the direction of movement of the fingers changes from a first direction, in which the fingers moved generally rearwardly to sweep the cop rearwardly onto the table or draper, to a second direction in which the fingers are pulled upwardly generally along their length to be pulled out of the crop as the crop continues to move rearwardly as it is released. This pattern of movement of the fingers is known to a person skilled in the art. That is the conventional finger pattern changes the angular velocity of the fingers around the bat axis at the different locations in the bat circle. The fingers rotate around the bat axis rapidly from the retracted position 281 approximately at 5.00 at which they are most angularly retarded to a position between 12.00 and 5.00 at which they are angularly advanced. At the 5.00 position the fingers rapidly move to the retarded position in which release occurs.

This requires the an advancement of the angular position of the angular adjustment component in the forward or counter-clockwise direction effectively to match the forward movement of the reel itself.

As shown in FIGS. 6 and 7, the guide track is concave and arcuate so that at a middle position 212 along the arms the cam 30 is most angularly retracted as the follower 502 is closest to the straight portion 202 of the mounting arm 21 so distance D is a minimum and at forward and rearward ends 210, 211 of the straight portion 202 of the mounting arm 21, the cam is most advanced because the distance D is at a maximum.

The adjustment component is used for a first crop in a range from the middle position 212 to the forward end 211 and is used for a second crop in the range from the middle position 212 to the rearward end 210.

In the first crop range from the center position 212 to the forward position 211, the operation of the guide track 503 on the wheel 502 is to maintain the "release point" of the fingers in the same correct position, which is located just behind the cutter bar, even though the reel itself is moved forwardly. This requires the an advancement of the angular position of the angular adjustment component in the forward or counter-clockwise direction effectively to match the forward movement of the reel itself. That is the position of the release point 281 shown in FIG. 6 which is immediately at or just behind the cutter bar is the required position and this is maintained as accurately as possible as the reel is moved forwardly and rearwardly by the operation of the track 503 and follower 502. Preferably this position is maintained within a distance of the order of 6 inches and preferably less than the order of 1.0 to 2.0 inches as the reel moves forwardly and rearwardly.

The position shown in FIG. 7 is related to the rear part of the adjustment and hence shows the release point 281 moved significantly rearwardly over a distance that is not acceptable for the forward part of the track. That is in the second or rearward part of the track form the center point 212, the cam is moved to advance yet further forwardly as the reel moves rearwardly which is the opposite of the required movement in the forward part of the track.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:
   a header frame structure arranged for movement in a direction of working movement across ground carrying a crop to be harvested;
   a cutter bar arranged across a forward edge of the header frame structure for cutting the crop;
   a cut crop transport arrangement mounted on the header frame structure for receiving and transporting the cut crop for further processing;
   a reel for controlling movement of the crop in the area over the cutter bar;
   the header frame structure comprising at least two reel mounting arms for movement therewith in the direction of working movement;
   the mounting arms being mounted on the header frame structure for upward and downward movement relative to the cutter bar;
   each mounting arm having a reel mounting assembly supporting the reel on the mounting arm for rotation about a reel axis generally parallel to the cutter bar;
   each reel mounting assembly including a component for moving the reel forwardly and rearwardly along the respective reel mounting arm;
   the reel having a plurality of reel bats at spaced positions around the reel axis, each reel bat having reel fingers projecting generally radially outwardly from the reel axis, the reel bats all lying on a common bat circle around the reel axis so that rotation of the reel causes the reel bats to follow a path of movement lying on the bat circle;
   each of the reel bats being pivotal about its respective bat axis parallel to the reel axis so as to vary the angle of the fingers about, the bat axis as the reel rotates;
   at least one of the reel mounting assemblies including a control component arranged such that, as the reel rotates, the control component cooperates with the respective bat to cause pivotal movement of the respective bat about the bat axis;
   and an adjustment component comprising a linkage interconnecting at least one of the mounting arms and at least one of the reel mounting assemblies, the linkage including a guide plate fixed to the mounting arm and having an elongated guide track formed therein and a guide track follower fixedly mounted to the control component and slidably received in the guide track wherein the control component rotates about the reel axis in response to longitudinal sliding movement of the guide track follower along the guide track.

2. The crop harvesting header according to claim 1 wherein the control component comprises a cam track member surrounding the reel axis and lying in a radial plane of the reel axis wherein each bat has associated therewith a cam follower which follows the cam track member.

3. The crop harvesting header according to claim 2 wherein the cam track member is held during rotation of the reel against rotation with the reel relative to the reel axis.

4. The crop harvesting header according to claim 1 wherein the guide track provides an arcuate shape which moves the guide track follower to different laterally spaced positions relative to the arm at different longitudinal locations along the arm.

5. The crop harvesting header according to claim 4 wherein the guide track is not parallel to the arm.

6. The crop harvesting header according to claim 4 wherein the guide track is arranged to move the guide track follower to a position spaced further from the mounting arm as the mounting assembly moves forward along the mounting arm.

7. The crop harvesting header according to claim 6 wherein the guide track follower is behind the reel axis so as to rotate the cam track member to angularly advance the cam track member in the direction of rotation of the reel in response to sliding movement of the guide track follower along the guide track as the mounting assembly moves forward along the mounting arm.

8. The crop harvesting header according to claim 1 wherein the guide track is arranged to rotate the cam track member to angularly advance the cam track member in the direction of rotation of the reel in response to sliding movement of the guide track follower along the guide track as the mounting assembly moves forward along the mounting arm.

9. The crop harvesting header according to claim 1 wherein the reel fingers move around the reel axis to define an extraction point of the finger movement at which the fingers effectively move along their length to extract from the crop and wherein the control component is rotated so as to angularly advance the extraction point as the mounting assembly moves forward along the mounting arm.

10. The crop harvesting header according to claim 1 wherein the adjustment component is arranged such that, at a middle position along the mounting arms the control component is most retracted and at forward and rearward ends of the mounting arms the control component is most advanced.

11. The crop harvesting header according to claim 10 wherein the adjustment component is used for a first crop in a range from the middle position to the forward end and is used for a second crop in the range from the middle position to the rearward end.

12. The crop harvesting header according to claim 10 wherein the linkage comprises the guide track extending along the arm and the guide track follower attached to said at least one of the reel mounting assemblies' wherein the guide track defines an arcuate shape which provides the middle and advanced positions.

13. The crop harvesting header according to claim 1 wherein the control component is adjustable by a further adjustment component, which causes the control component to be rotated about the reel axis to different adjustment angles, which is independent of said adjustment component.

14. The crop harvesting header according to claim 13 wherein the further adjustment component is actuated manually.

15. The crop harvesting header according to claim 13 wherein the further adjustment component is actuated by an operator in response to changes of crop.

* * * * *